United States Patent [19]
Zaborney et al.

[11] Patent Number: 5,443,668
[45] Date of Patent: Aug. 22, 1995

[54] METHOD FOR LABELING AN ELECTROCHEMICAL CELL

[75] Inventors: John F. Zaborney, Carmel, N.Y.; William N. Tinsley, Brookfield, Conn.

[73] Assignee: Duracell, Inc., Bethel, Conn.

[21] Appl. No.: 321,188

[22] Filed: Oct. 11, 1994

Related U.S. Application Data

[60] Division of Ser. No. 214,711, Mar. 14, 1994, Pat. No. 5,368,953, which is a continuation of Ser. No. 19,931, Feb. 19, 1993, abandoned.

[51] Int. Cl.[6] .............................. H01M 2/02; B32B 31/00
[52] U.S. Cl. ................................ 156/86; 156/277; 29/623.4; 429/167; 429/176
[58] Field of Search ................. 156/86, 277; 29/623.4; 429/167, 176

[56] References Cited

U.S. PATENT DOCUMENTS

| | | | |
|---|---|---|---|
| 4,608,323 | 8/1986 | Zabornem | 429/167 |
| 4,911,994 | 3/1990 | Will et al. | 429/167 |
| 4,983,238 | 1/1991 | Yoshida et al. | 156/86 |

*Primary Examiner*—John S. Maples
*Attorney, Agent, or Firm*—Ronald S. Cornell; Barry D. Josephs

[57] ABSTRACT

A decorative jacket for a battery cell and the jacket applied to the cell, are disclosed. The jacket is a flat-wrap label, preferably formed of a single heat-shrinkable polymeric film and non-metallic ink design imprinted on the inside surface of the film. The film and ink design resist corrosion when exposed to corrosive atmospheres. The ink design is not electrically conductive. The label is applied by wrapping it around the cell outer surface with the ink design and inside surface of the film facing the cell. Preferably the entire label is subjected to a quick dose of heat to snap extended portions of the label over the top and bottom edges (shoulders) of the cell.

4 Claims, 3 Drawing Sheets

METHOD FOR LABELING AN ELECTROCHEMICAL CELL

This application is a division of application Ser. No. 08/214,711 filed Mar. 14, 1994 now U.S. Pat. No. 5,368,953, which was a continuation of application Ser. No. 08/019,931, filed Feb. 19, 1993 (abandoned).

The invention relates to decorated jackets for electrochemical cells, particularly alkaline cells.

Aesthetically pleasing packaging is generally desired for electrochemical cells or batteries which are sold to the consuming public. Such packaging requires that the manufacturer's logo and any other ink design or text be clearly visible on a label permanently secured to the the outside of the cell. The logo or any graphics and text on the label should also be free of distortion. Distortion can be a problem any time the label or any portion thereof is shrunk into place. by the application of heat.

A cell is normally of cylindrical shape having a top and bottom shoulder formed at the junction between the cell casing and a peripheral portion of the cell's top and bottom surface. Conventional flat adhesive coated labels, typically employed in labeling glass or plastic bottles, are not suitable for application to such cells. The labeling of conventional cells, for example, requires that the label have extended portions which extend beyond the top and bottom shoulders of the cell and cover at least a peripheral portion of the cell's top and bottom surfaces. The extended portions of the label are not satisfactorily secured to the cell's top and bottom surfaces when flat adhesive coated labels are employed.

The extended portion of the label functions as an electrical insulator between at least one of the cell's caps and the cell casing and typically also as a protective layer between the other of the cell's caps and the cell casing. Additionally, the label structure must assure that the logo and other decorations imprinted thereon are adequately protected from the environment and will resist attack by corrosive materials employed in the cell during its manufacture. For example, in the manufacture of alkaline cells, alkaline electrolyte such as KOH can permeate the environment around the cell and degrade the appearance of an exposed ink design layer on the label. It is often desired to employ metallic inks for the logo or ink design layer to give the cell label a rich metallic appearance. Metallic inks degrade quickly in appearance if exposed to a corrosive atmosphere, and thus, particular care must be taken that they not be exposed to such an atmosphere.

One prior method of labeling cells employs a metallic ink design layer and involves the use of double-ply heat-shrinkable films. The method involves first preshrinking a heat-shrinkable jacketed tube, e.g. of polyvinylchloride, to approximately the cell size. The ink design layer is then printed onto the outer surface of the jacket and a second film applied over the ink design layer to encase it. Alternatively, the ink design layer can be imprinted on a flat heat-shrinkable film and the ink design layer covered by another heat-shrinkable film to encase the design. In this latter case the film is then formed into a tubular jacket by sealing overlapping ends to each other. Such double-ply films which are either pre-formed or later formed into tubular jackets can be applied over the cell and heat-shrunk onto the cell surface by applying heat uniformly over the entire jacket. In double-ply film labels, distortion in the film can occur if the film is subjected to uniform heating without preheating the cell surface. The distortion is caused by the tendency of the outside film layer, which is closest to the heat source, to shrink faster than the inside film. The use of separate films to encase the ink design layer is costly and does not prevent some of the corrosive atmosphere, e.g., caused by alkaline electrolyte, from wicking between the two separate films during the manufacturing process.

Tubular jackets, if employed, are normally formed in long continuous tubes which are flattened and wound into a roll for convenient storage. When the tubes are flattened two parallel crease lines are formed. Care must be taken when flattening the tubular jackets that the crease lines do not distort printed text or logo design on the jacket. In use, the flattened tubes are cut to the battery length and opened forming individual tubular jackets, which are placed over the battery surface and then subjected to heat-shrinking. Although the crease lines may be properly placed, they can nonetheless be visible on the jacket surface and thereby detract from the aesthetic appearance of the jacket. Further, misplacement of the crease lines when forming the tube can lead to scrapping an entire roll of labels.

In U.S. Pat. No. 4,608,323 (Zaborney) a tubular cell jacket is disclosed. The cell jacket is formed of a heat shrinkable film such polyvinylchloride which has been imprinted on one side with a decorative design. Preferably a metallic ink, e.g containing aluminum, is used for the decorative design. A protective clear vinyl lacquer is applied over the decorative design thereby sealing it from the environment. The film is then formed into a tubular shape with the inside surface of the film containing the decorative design and lacquer coating. The film is kept in a tubular shape by adhesively securing or heat sealing overlapping ends to each other. The tubular film is placed over the outer surface of the cell so that its upper and lower edges extend beyond the top and bottom shoulders of the cell. Heat is then applied uniformly over the entire film whereupon the film shrinks to form a tight jacket covering the surface of the cell including the cell top and bottom shoulders.

Accordingly, it would be desirable to have a battery cell label which gives a lustrous appearance and protects the ink design layer and logo from abrasion and chemically corrosive environments.

It would be desirable to have a battery cell label which contains only a single-sheet of a crease free heat-shrinkable polymeric film.

It would be desirable to have a cell label which gives a metallic appearance, but does not contain metal.

It would be desirable to have a method of applying the label securely around the cell's outer surface and shoulders without the need to pre-form the label into a tubular shape.

It would be desirable to eliminate crease lines on the label surface.

The invention will be better understood with reference to the drawings in which.

The present invention is directed to a label wrapped circumferentially around the outside surface (casing) of an electrochemical cell or battery, particularly cylindrical cells which are of standard AAA, AA, C or D sizes. These cell sizes are well established and as a group range in diameter between about 9 mm and 32 mm and in length between about 45 mm and 60 mm. The label of the invention is also specifically applicable to any cylindrical cell sizes having dimensions between these stated ranges. The leading edge of the label adheres to the cell and the trailing edge adheres to the outer surface of the adhered leading edge forming a permanent jacket around the cell's casing. The label is slightly longer than the length of the cell outer surface (casing) so that after the label is applied around it, a portion of the label extends beyond the casing top and bottom edges (shoulders). The shoulders of the cell forming the cell's top and bottom edges are defined as the end portions, respectively, of the cell casing which form a 90° angle with the body of the casing surface. Preferably the entire label is exposed to a quick dose of heat which is sufficient to cause the top and bottom ends of the label to shrink around the cell's shoulders. The main portion of the label which is snugly wrapped around the cell casing does not shrink appreciably, even though exposed to heat.

The label preferably contains only a single sheet of heat-shrinkable polymeric film with decorative designs on the inside surface of the film facing the cell whereby the label and decorative designs thereon are abrasion resistant. They also resist degradation caused by corrosive atmospheres which may be present in the vicinity of the cell during its manufacture. In a preferred embodiment the decorative designs on the label have an attractive metallic appearance, but yet do not contain metallic inks and are not electrically conductive. Additionally, since the label is not pre-formed into a tubular shape and flattened, there are no crease lines appearing on the label surface.

Figure 1:
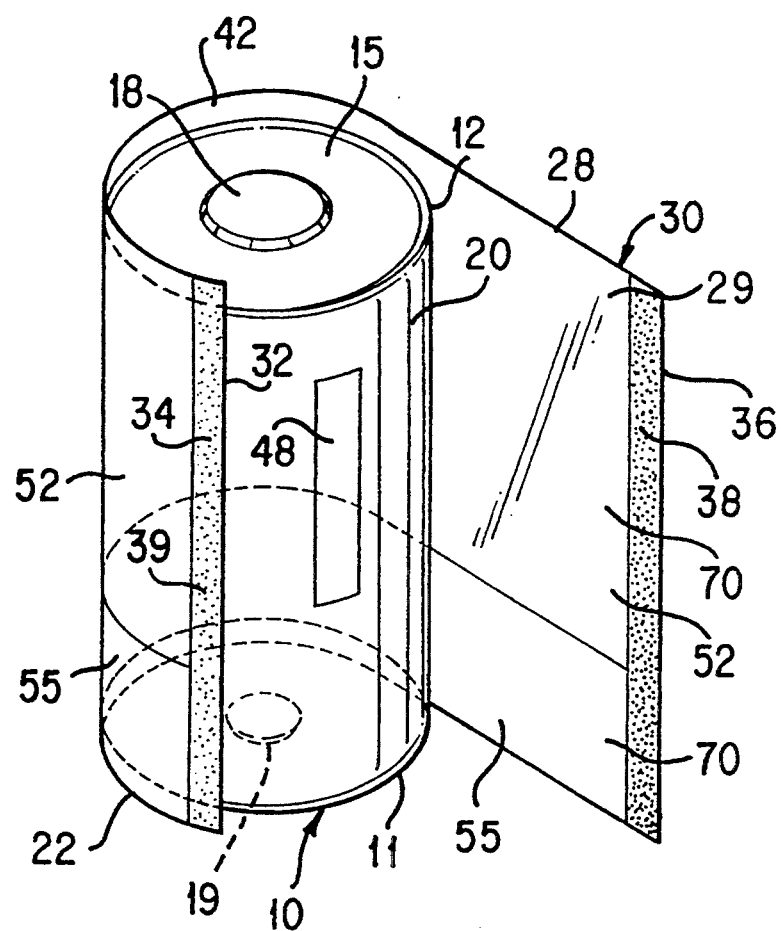
FIG. 1 is a perspective view of the flat-wrap label of the invention being applied around a battery cell casing.

Preferred embodiments of the invention are shown in FIGS. 1 to 6. As illustrated in FIG. 1, label 30 contains a heat-shrinkable polymeric film 28 coated or imprinted on its inside surface 29 with a decorative design layer 70. In figure 1 label 30 is shown in the form of a flat-wrap label being wrapped around outer surface (casing) 20 of battery cell 10 with the label's inside surface 29 and ink design layer 70 facing the cell's outer surface 20. Casing 20 is typically of steel.

A coating of adhesive material or glue 34 is first applied along the label's inside surface at leading edge 32. The adhesive 34 may be a narrow strip of a pick-up adhesive preferably covering the entire width of label 30. Adhesive 34 may be selected from any conventional adhesive, or glue. It is not required that the adhesive have permanent bonding (peel) strength. Its function is merely to "pick-up" the label from the label-supply source and hold leading edge 32 against casing 20 as the label is wrapped around the casing. As a result the adhesive may be selected from a wide variety of materials which are typically applied at ambient temperature. Hot melt adhesives may be employed but are less desirable, since care must be taken not to shrink film 28. For example, adhesive 34 may be a solvent which when applied to the inside surface of leading edge 32 causes it to become soft and tacky. Alternaltively, it may be a liquid which changes the interfacial surface tension sufficiently to cause leading edge 32 to adhere instantly to the body of cell surface 20 once contact is made. (In this latter case or if adhesive 34 is very weak, some mechanical pressure may be exerted against leading edge 32 to hold it against casing.20 as label 30 is wrapped around the casing.) A specific suitable adhesive 34 is a household glue such as the well known Lepages paper glue manufactured by Lepages, Inc., Pittsburgh, Pa. This glue functions satisfactorily if applied along leading edge 32 in a coating width typically of about 1 mm.

Figure 4:
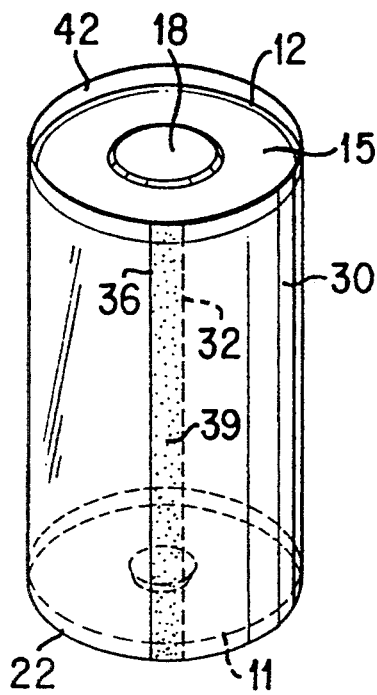
FIG. 4 is a perspective view of the label wrapped around a battery cell casing and showing the negative end of the cell.
Figure 5:
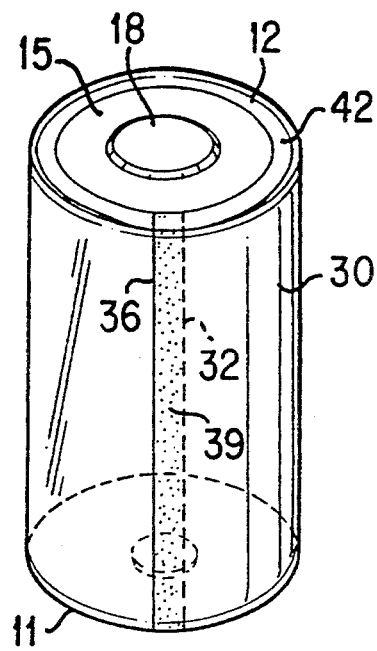
FIG. 5 is a perspective view of the embodiment shown in FIG. 4 after the label has been exposed to heat to shrink the ends around the top and bottom shoulders of the cell.

After leading edge 32 instantly adheres to cell surface 20, label 30 is wrapped around the cell. Prior to label 30 being fully wrapped around the cell, bonding means 38 is applied in a strip along the inside surface at trailing edge 36. Bonding means 38 may be an adhesive including solvent based adhesives, hot melt adhesives, glues or reactive solvents. However, it is preferred to employ a reactive solvent for bonding means 38. The term "reactive solvent" as used herein is a solvent which when applied to a polymeric film causes it to soften or at least partially soften. This enables the film to fuse to itself when the solvent is applied between two of the film surfaces. A preferred solvent causes the label to begin to soften immediately on contact. Thus, as label 30 is wrapped around the cell's outer surface (casing) 20 and pressed against a portion of the exposed side of the label 30, it permanently bonds or fuses thereto and forms a secure wrap around the cell as shown in FIG. 4. The bond is formed at overlapped portion 39 which is on the exposed side of label 30, typically at or near leading edge 32. It is preferred that the solvent is volatile so that it substantially completely evaporates after the bond is formed. Thus, an adhesive is not required to form the bond and the bond formed with the solvent is adhesive-free similar to a cold weld. The above described method of bonding shall be referred to herein as solvent-fusing.

A preferred label is heat shrinkable, though flexible, and able to fuse to itself when the solvent is applied. A preferred label 30 having these properties contains only a single layer of heat shrinkable polymeric film, preferably polyvinylchloride (PVC) film, however, polyethylene terephthalate film (PET) and glycol modified polyethylene terephthalate film (PETG), are also suitable. Label 30 is not intended to be limited to these materials as other heat shrinkable, flexible polymeric films can be employed. If label 30 is composed of PVC film, then a preferred solvent 38 is tetrahydrofuran (THF). Each label 30 at the time of application has a length in the cell's longitudinal axial direction which is slightly longer than the length of cell surface 20 as measured between the top and bottom shoulders 12 and 11, respectively. (Shoulders 12 and 11 form a 90° angle with the body of cell surface 20). Thus, after the label is wrapped around cell surface (casing) 20, a portion of the label's top end 42 and a portion of its bottom end 22 extend slightly beyond the cell's top and bottom shoulders 12 and 11, respectively, as illustrated in FIG. 4. This provides an insulating and/or protective layer over cell shoulders 11 and 12. Label 30 is also cut prior to application so that at right angles to its length it has a width which is greater than the circumference of the cell. Thus as label 30 is wrapped around cell surface 20 it completely surrounds the cell surface with trailing edge 36 overlapping leading edge 32.

Those skilled in the art of labelling may consider it unusual and difficult to label small diameter cylindrical articles such as AAA, AA, C and D size cells by the above described method. This is because a film-label has a much greater tendency to spring away from the surface of small diameter objects than large diameter objects such as bottles and cans. This is caused by the natural recoil tension of polymeric films, which becomes greater when the film is wound around the smaller diameter object. Nevertheless, we have found that the labels herein can be adequately secured to small diameter cylindrical articles such as AAA, AA, C and D size cells even though only small portions of the label, as above described, are exposed to adhesive bonding or solvent-fusing.

The ink design layer 70 coated or imprinted onto inside surface 29 of film 28 contains the desired logo and decorative designs. Preferably, a non-corrosive ink is employed for all of the ink design layer 70. The preferred ink design layer 70 does not degrade if exposed to an alkaline environment such as may be present during manufacture of the cells. Also the ink should have a sufficiently low resistivity that it will not cause electrical shorting between the negative and positive terminals 18 and 19, respectively. In order to accomplish this, a non-metallic ink is employed. A "non-metallic" ink as referenced herein shall be defined as an ink having a total metal content of less than about 1000 ppm by weight (dried ink basis). Preferably the non-metallic ink as used herein is inert to attack by an aqueous solution of KOH of concentration 7 mols KOH per liter at a temperature of about 160° F. (71° C.) for a duration of about 30 minutes. ("Inert to attack" is defined as not sufficiently attacked by the KOH solution to cause a visible change in the appearance of the ink.) Preferably the non-metallic ink is formulated to give an attractive metallic appearance. The use of such an ink allows for a single-ply label, that is, a label containing only one heat-stretchable polymeric film web 28, and avoids the need to sandwich ink design layer 70 between two such polymeric films. This also makes it easier to heat seal the label's extended ends 22 and 42 over the cell shoulders 11 and 12, respectively. Also, the use a single-ply label eliminates the need to preheat the cell before extended ends 22 and 42 are heat-shrunk over shoulders 11 and 12.

A suitable non-metallic ink for design layer 70 which has the above described properties can be selected from a class of inks known in the art as "pearlescent" inks. Such inks are composed of pigment, e.g., titanium dioxide, which is resistant to attack by KOH, a carrier (resin binder) and solvent as in metallic inks, but contain mica flakes instead of metallic particles. The carrier is typically selected from vinyl copolymers or acrylics. Compatible solvents may typically be ester solvents such as n-propyl acetate or ethyl acetate. The mica flakes are preferably coated with iron oxide or titanium oxide. The mica flakes are not electrically conductive and give the ink pigment a lustrous metallic appearance. This type of ink is preferred for the entire ink design layer 70 or at least that portion of the ink design 70, namely portion 52 which is closest to the cell's negative terminal. The non-conductive nature of ink portion 52 prevents any chance of a short circuit developing caused by inadvertent contact between ink portion 52 and the cell's negative terminal 18. (This assumes cell 10 is a conventional alkaline cell where the cell casing 20 is electrically positive.) If a metallic appearance is not required, a lustrous non-metallic ink, e.g a black ink suitable for ink design layer 70 may be employed without the mica flakes. Such inks may be formulated by using nonconductive carbon black as the pigment.

A single sheet of heat stretchable clear film stock 28, preferably of polyvinylchloride having a thickness of about 6 mil is subjected to heat-stretching in the machine direction to about 2.0 to 2.2 times its unstretched length. (The term "heat-stretching" as used herein refers to the known method of applying heat while stretching a polymeric film.) The clear film is typically heat-stretched in the transvere direction preferably up to 1.10 times its unstretched width, typically between about 1.03 to 1.05 times its unstretched width. The film is then imprinted on its inside surface 29 with the desired design layer 70 employing preferably the non-metallic, non-conductive type inks above referenced. The ink may be imprinted employing conventional gravure or flexographic printing techniques.

Figure 2:
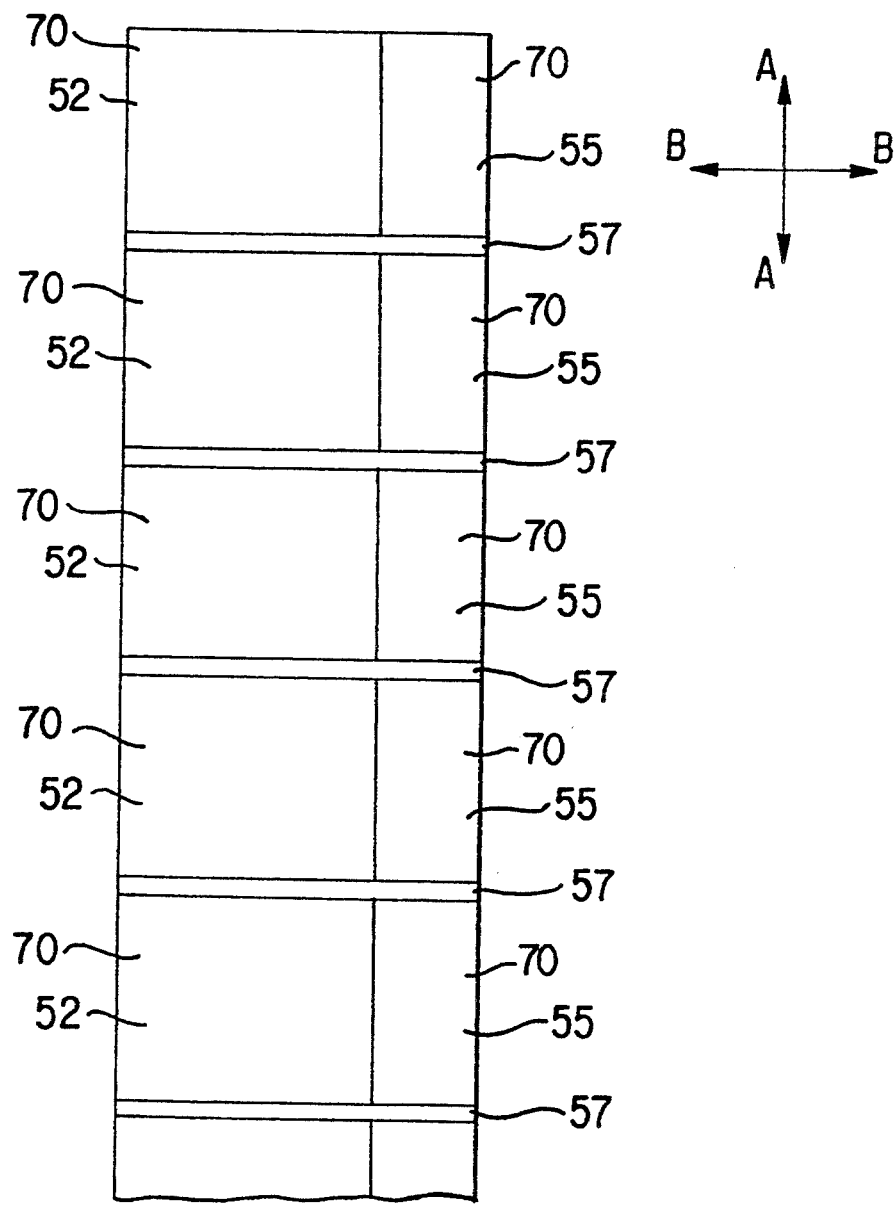
FIG. 2 is a plan view of a sheet of printed labels before they are cut.
Figure 3:
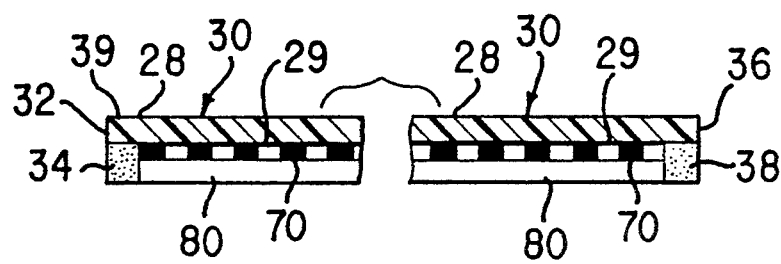
FIG. 3 is a cross-sectional view of a printed label.

The imprinted film contains a repetitive pattern of the ink design layer as shown in FIG. 2. The machine direction of the film is represented by the arrows A—A and the transverse direction by the arrows B—B in FIG. 2. The imprinted film is cut at clear areas 57 which separate the repetitive design patterns. Individual labels are then formed which can be wrapped around cell 10 and secured to the cell in the manner above described. Label 30 is applied so that the machine direction (A—A) of film 28 is in the cell's circumferential direction and the transverse direction (B—B) of film 28 is in the cell's longitudinal axial direction. Since the ink design layer 70 is non-corrosive and non-electrically conductive it can come into direct contact with the cell surface 20. Ink design layer 70 may be optionally coated with a thin coating of a non-conductive ink 80 containing titanium dioxide (FIG. 3). The purpose of this coating, if employed, is to enhance the colors of ink design layer 70 and to minimize show-through of can blemishes.

Figure 6:
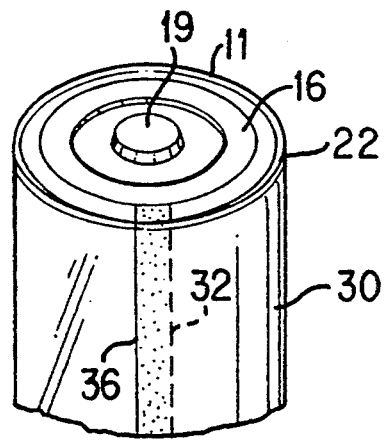
FIG. 6 is a perspective view of the embodiment shown in FIG. 5, but showing the positive end of the cell.

After the label is wrapped around cell surface 20 and secured thereto by adhesive layer 34 and bonding means 38 as above described, the entire jacketed cell is briefly heated, preferably by passage through a heat tunnel (not shown). Label 30 adhered to cell surface 20 with ends 22 and 42 heat shrunk onto shoulders 11 and 12, respectively, is illustrated in FIG. 6. It has been determined that only a small amount of heat is required to accomplish the heat-shrinking of extended ends 22 and 42. This is due to the preferential heat-stretching of the film 28 in the machine direction (direction A—A, FIG. 2) relative to the transverse direction. This causes the label's extended ends 22 and 42 to snap tightly over the cell's shoulders 11 and 12, respectively, when exposed to a small amount of heat.

Since the body of film 28 is wrapped around the cell casing 20 before film 28 is subjected to heat, the film body shrinks only very little in relation to the amount of shrinkage of extended ends 22 and 42. In fact, the extended ends 22 and 42 shrink at least twice as much per unit area as the body portion of film 28. A distortion-free label can conveniently be obtained by pre-stretching the label in the machine direction between about 2.0 and 2.2 times its original (unstretched) length and only up to 1.1 times its unstretched length in the transverse direction prior to application of ink design layer 70. When the label is polyvinylchloride, the pre-stretching may suitably be accomplished at temperatures between about 230° and 250°.

Since label 30 of the invention does not crease when applied to the cell and is subjected to only a small amount of heat during application, the label is also well suited for covering and protecting certain thin devices which may be attached to the battery cell outer surface. Such devices, for example, may be thin-film voltage indicators which indicate the condition of the cell. A representative indicator of this type is disclosed in U.S Pat. No. 5,059,895, herein incorporated by reference. These indicators are of a film-laminate structure, typically having a thickness of less than 100 mil (2.5 mm). Such devices (48) can be located on battery cell outer surface 20 and electrically connected to to the cell terminals. They may be covered and held in place by the label 30 of the invention or alternatively, may be integrally affixed to the label or the cell before the label is applied around the cell.

Although the present invention was described with respect to preferred embodiments, it should be recognized that changes can be made in structure, placement, materials and the like without departing from the scope of the invention. For example, the labels applied to the cells are not intended to be restricted to specific materials or specific formulations for the adhesive or ink design layers.

What is claimed is:

1. A method for applying a film label to an electrochemical cell having a cylindrical casing, comprising the steps of:

a) heat-stretching a polymeric film in a first direction to a greater degree than in a second direction at right angles to said first direction;

b) printing a cell label design on one surface of said film;

c) cutting said film to form a label, said label being longer than the length of the cell casing and wider than the circumference of the cell;

d) contacting a first edge of said label to the casing;

f) wrapping said label around the casing such that said first direction follows the cell's circumference and said second direction is substantially parallel to said cell's longitudinal axis and a portion of said label extends beyond each end of the casing; and g) overlapping and bonding a second edge of said label to an adjacent portion of the outer surface of said first edge; and h) applying heat to the label to shrink said extending portions around the ends of the casing.

2. The method of claim 1 including the step of applying a strip of adhesive to the first edge of the label on the same side of the label as the label design and parallel to the cell's longitudinal axial direction.

3. The method of claim 1 wherein the film is heat-stretched in the first direction to between about 2.0 and 2.2 times said film's unstretched length in that direction and wherein the label is heat-stretched in the second direction to between about 0 and 0.1 times said label's unstretched length in said second direction.

4. The method of claim 1 wherein said second edge of the label is bonded to the outer surface of said first edge of the label by applying a volatile solvent which solvent is capable of softening said film between said first and second edges.

* * * * *